United States Patent
Yoon et al.

(10) Patent No.: US 8,591,771 B2
(45) Date of Patent: Nov. 26, 2013

(54) DISPERSED SOLUTION OF CARBON NANOTUBES AND METHOD OF PREPARING THE SAME

(75) Inventors: Seon-mi Yoon, Yongin-si (KR); Jae-young Choi, Yongin-si (KR); Un-gyu Paik, Seoul (KR); Jin-hyon Lee, Gyeongsan-si (KR)

(73) Assignee: Samsung Electronics Co., Ltd. (KR)

( * ) Notice: Subject to any disclaimer, the term of this patent is extended or adjusted under 35 U.S.C. 154(b) by 1940 days.

(21) Appl. No.: 11/624,928

(22) Filed: Jan. 19, 2007

(65) Prior Publication Data
US 2013/0187084 A1 Jul. 25, 2013

(30) Foreign Application Priority Data
Apr. 14, 2006 (KR) .................. 10-2006-0034184

(51) Int. Cl.
*H01B 1/04* (2006.01)
*B82Y 40/00* (2011.01)
*C01B 31/00* (2006.01)

(52) U.S. Cl.
USPC ........... 252/502; 252/500; 252/510; 252/511; 423/445 B; 427/122; 524/495; 524/496; 977/742; 977/745

(58) Field of Classification Search
USPC ............... 252/500–511; 423/445 B; 427/122; 524/495, 496; 977/742, 745
See application file for complete search history.

(56) References Cited

U.S. PATENT DOCUMENTS

| | | | |
|---|---|---|---|
| 2004/0266939 A1* | 12/2004 | Chen et al. | 524/496 |
| 2005/0148179 A1* | 7/2005 | Hirai et al. | 438/689 |
| 2006/0052509 A1* | 3/2006 | Saitoh | 524/496 |
| 2006/0189822 A1* | 8/2006 | Yoon et al. | 560/130 |
| 2006/0252853 A1* | 11/2006 | Ajayan et al. | 523/215 |
| 2007/0137701 A1* | 6/2007 | Sainte Catherine et al. | 136/263 |
| 2007/0292622 A1* | 12/2007 | Rowley et al. | 427/407.1 |

FOREIGN PATENT DOCUMENTS

| | | | |
|---|---|---|---|
| FR | WO2004112163 A1 * | 12/2004 | |
| JP | 2005162877 A | 6/2005 | |
| JP | 2005200280 A | 7/2005 | |
| JP | 2005 219986 | 8/2005 | |
| KR | 1020010102598 | 11/2001 | |
| KR | 1020030086442 | 11/2003 | |
| KR | 1020040103325 | 12/2004 | |
| KR | 1020050097711 | 10/2005 | |
| KR | 1020050110912 | 11/2005 | |
| KR | 1020070076875 A | 7/2007 | |
| KR | 1020070077334 A | 7/2007 | |

OTHER PUBLICATIONS

Feng et al. ("Perylene derivative sensitized multi-walled carbon nanotube thin film." Carbon, 43, pp. 2501-2507, Jun. 23, 2005).*
Fujita et al. ("Formation of small-diameter carbon nanotubes from PTCDA arranged inside the single-wall carbon nanotubes." Chem. Phys. Let., 413, pp. 410-414, Aug. 30, 2005).*

(Continued)

*Primary Examiner* — Tri V Nguyen
(74) *Attorney, Agent, or Firm* — Cantor Colburn LLP

(57) ABSTRACT

Disclosed herein are a dispersed solution of carbon nanotubes including carbon nanotubes, an organic solvent, a spacer, and a dispersant, and a method of preparing the same. The dispersed solution of the carbon nanotubes includes both the spacer, which reduces the van der Waals force of the carbon nanotubes and prevents bundling of the carbon nanotubes, and the dispersant, which maintains the debundling and stability of the carbon nanotubes, thereby improving the dispersibility of the carbon nanotubes. The method of preparing the dispersed solution of the carbon nanotubes can easily produce a dispersed solution of carbon nanotubes without performing a separate chemical treatment.

18 Claims, 5 Drawing Sheets

(56) References Cited

OTHER PUBLICATIONS

Paloniemi et al. ("Water-Soluble Full-Length Single-Wall Carbon Nanotube Polyelectrolytes: Preparation and Characterization." J. Phys. Chem. B, 109, pp. 8634-8642, Apr. 5, 2005).*

Phys. Rev. B46, 1804 (1992).
Phys. Rev. Lett. 68, 1579 (1992).
Tan, et al., "Dispersion of Single-Walled Carbon Nanotubes of Narrow Diameter Distribution", J. Phys. Chem. B, vol. 109, No. 30, 2005, pp. 14454-14460.

* cited by examiner

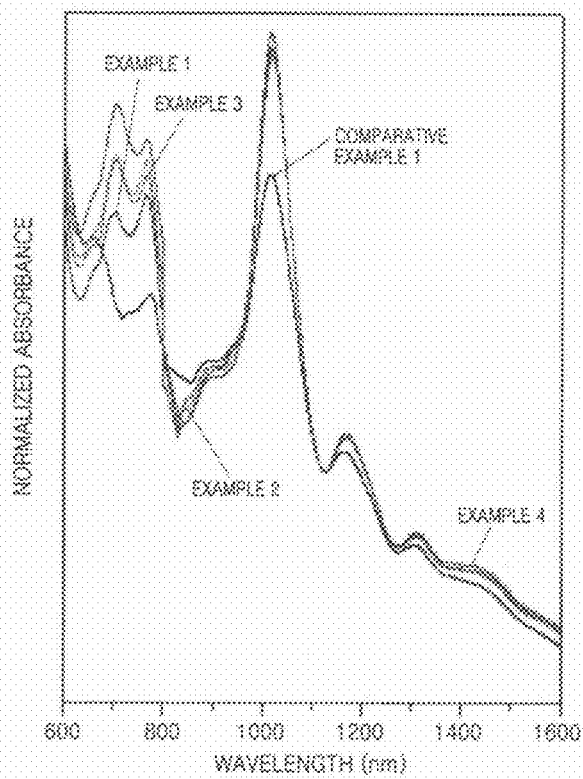

DISPERSED SOLUTION OF CARBON NANOTUBES AND METHOD OF PREPARING THE SAME

This application claims priority to Korean Patent Application No. 10-2006-0034184, filed on Apr. 14, 2006, in the Korean Intellectual Property Office, and all the benefits accruing therefrom under 35 U.S.C. §119, the contents of which are incorporated herein by reference in its entirety.

BACKGROUND OF THE INVENTION

1. Field of the Invention

The present invention relates to a dispersed solution of carbon nanotubes and a method of preparing the same. More particularly, the present invention relates to a dispersed solution of carbon nanotubes including a spacer and a dispersant, and a method of preparing the same.

2. Description of the Related Art

Since discovery of carbon nanotubes (CNTs) by Iijima in 1991, carbon nanotubes have attracted tremendous research interests as new materials. Carbon nanotubes are tubes made of carbon atoms arranged in a hexagonal, honeycomb-like structure, and have new physical properties due to their nanometer-scale diameters.

The electrical characteristics of carbon nanotubes depend on the structure and diameter of the carbon nanotubes. That is, carbon nanotubes can behave like insulators, semiconductors, or conductors according to their structure and diameter. For example, if the shape or chirality of insulating, spiral carbon nanotubes is changed, motion of free electrons in the carbon nanotubes is changed. As a result, the carbon nanotubes behave like conductors due to relatively free motion of the free electrons or semiconductors due to the presence of barriers.

Carbon nanotubes have characteristics of good dynamic robustness and chemical stability, of both semiconductors and conductors, and of a small diameter, a long length, and a hollow center. Thus, carbon nanotubes are suitable as materials for use in flat panel displays, transistors, energy storage media, and the like, and have high applicability to various nanometer-scale electronic devices.

In order for carbon nanotubes to be used in formation of conductive films or in manufacturing of various electronic devices, the carbon nanotubes must be effectively dispersed in a matrix such as a solution or a polymer. However, carbon nanotubes tend to agglomerate into bundles in a matrix due to a strong van der Waals forces. Thus, carbon nanotubes are hardly soluble in water or other solvents, which makes it difficult to process the carbon nanotubes.

If carbon nanotubes agglomerate in a matrix, the intrinsic characteristics of the carbon nanotubes may be degraded, or upon formation of a thin film, uniformity of the film's thickness may decrease.

Due to the unique properties of carbon nanotubes, only use of commercially available dispersants makes it difficult to obtain a dispersed solution of carbon nanotubes which are sufficiently dispersed. Thus, various dispersion methods such as use of a new dispersant for uniformly dispersing or solubilizing carbon nanotubes in a solution or a binder have been proposed.

One method includes incorporating an alkyl group to carbon nanotubes using a chemical bond, another includes increasing the solubility of carbon nanotubes by surrounding the carbon nanotubes with a polymer capable of physically interacting with the carbon nanotubes, and another method includes attaching to carbon nanotubes at least one functional group selected from the group consisting of a cyano group, an amino group, a hydroxyl group, a carboxyl group, a halide group, a nitrate group, a thiocyano group, a thiosulfuric acid group, and a vinyl group. Although these methods can partially improve the dispersibility of carbon nanotubes, a cost increase may be incurred and the physical properties of the carbon nanotubes may be altered due to surface modification.

One method of improving the dispersibility of carbon nanotubes includes fluorinating the surfaces of the carbon nanotubes, another method includes sonicating a carbon nanotube-containing solution, and another includes using an aromatic polyamide as a dispersant. According to the above technologies, however, bundled carbon nanotubes are incompletely separated, which restricts the dispersion of carbon nanotubes.

In view of the above problems, there remains a need to develop a method of improving the dispersibility of carbon nanotubes.

BRIEF SUMMARY OF THE INVENTION

The present invention includes providing a dispersed solution of carbon nanotubes including a spacer and a dispersant.

The present invention also includes providing a method of preparing the dispersed solution of the carbon nanotubes.

According to an exemplary embodiment of the present invention, a dispersed solution of carbon nanotubes includes carbon nanotubes; an organic solvent; a spacer; and a dispersant.

In the dispersed solution of the carbon nanotubes, the spacer may be at least one of a substituted or unsubstituted $C_7$ to $C_{30}$ polycyclic aromatic hydrocarbon compound or a substituted or unsubstituted $C_3$ to $C_{30}$ heterocyclic aromatic compound.

In the dispersed solution of the carbon nanotubes, the $C_7$ to $C_{30}$ polycyclic aromatic hydrocarbon compound spacer may be pentalene, indene, naphthalene, azulene, heptalene, biphenylene, indacene, acenaphthylene, fluorene, phenalene, phenanthrene, anthracene, fluorathene, triphenylene, pyrene, chrycene, naphthacene, picene, perylene, pentaphene, hexacene, rubicene, coronene, trinaphthylene, heptaphene, heptacene, pyranthrene, or ovalene.

In the dispersed solution of the carbon nanotubes, the $C_3$ to $C_{30}$ heterocyclic aromatic compound spacer may be thiophene, thianthrene, phenothiarsine, furan, pyran, isobenzofuran, chromene, xanthene, phenoxatin, imidazole, pyrrole, pyrazole, isothiazole, isoxazole, pyridine, pyrazine, pyrimidine, pyradizine, pyrrolizine, indolizine, indole, indazole, purine, quinolizine, isoquinoline, phthalazine, naphthylidine, quinoxaline, quinazoline, cinnoline, pteridine, carbazole, phenantridine, acridine, perimidine, phenanthroline, phenazine, phenomercazine, phenarazine, phenophosphazine, phenotellurazine, phenoselenazine, phenotiazine, phenoxazine, isochroman, chroman, pyrrolidine, imidazolidine, pyrazolidine, piperidine, piperazine, indoline, isoindoline, morpholine, or a compound represented by Formula 1 below:

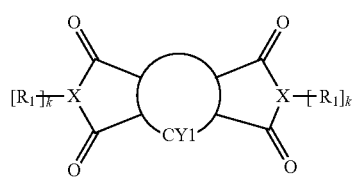

<Formula 1> wherein CY1 is an aromatic ring; X is oxygen or nitrogen; k is 0 when X is oxygen and is 1 when X is nitrogen; and $R_1$ is hydrogen.

In the dispersed solution of the carbon nanotubes, CY1 of Formula 1 may be one selected from the group consisting of

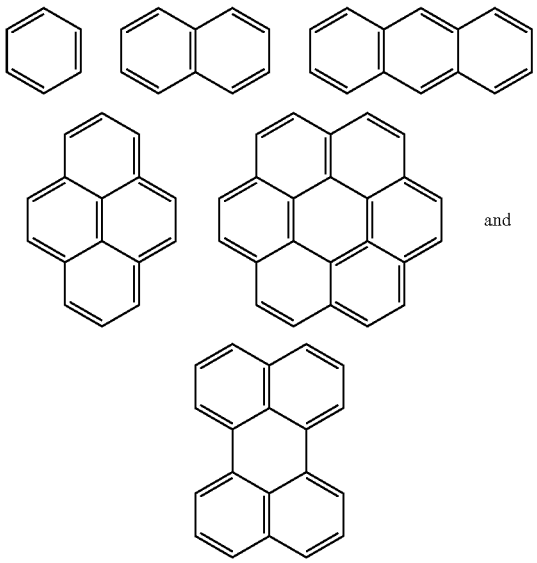

In the dispersed solution of the carbon nanotubes, the compound of Formula 1 may be a compound selected from the group consisting of compounds represented by Formulae 2-7 below:

<Formula 2>

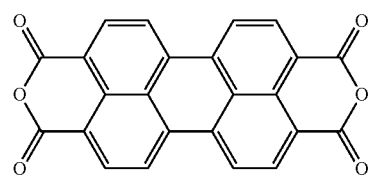

<Formula 3>

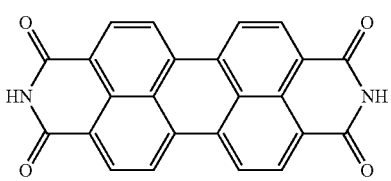

<Formula 4>

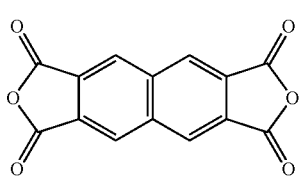

<Formula 5>

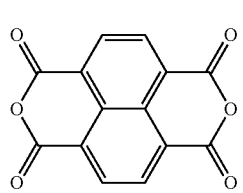

<Formula 6>

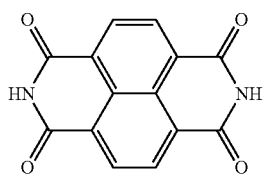

<Formula 7>

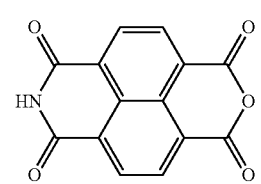

In the dispersed solution of the carbon nanotubes, the dispersant may be a compound including a head moiety including a substituted or unsubstituted $C_5$ to $C_{30}$ aromatic hydrocarbon group or a substituted or unsubstituted $C_3$ to $C_{30}$ heterocyclic aromatic group; and a tail moiety including a repeat unit of at least one selected from the group consisting of an acrylate group, an ethylene oxide group, a propylene oxide group, and an alkyl group, wherein the head moiety and the tail moiety may be connected to each other, and the molecular weight of the dispersant may be less than or equal to about 20,000.

The molecular weight of the dispersant may be less than or equal to about 5,000.

In the dispersed solution of the carbon nanotubes, the $C_5$ to $C_{30}$ aromatic hydrocarbon group of the head moiety of the dispersant may be a phenyl group, a pentalenyl group, an indenyl group, a naphthyl group, an azulenyl group, a heptalenyl group, a biphenylenyl group, an indacenyl group, an acenaphthylenyl group, a fluorenyl group, a phenalenyl group, a phenanthrenyl group, an anthracenyl group, a fluorathenyl group, a triphenylenyl group, a pyrenyl group, a chrycenyl group, a naphthacenyl group, a picenyl group, a perylenyl group, a pentaphenyl group, a hexacenyl group, a rubicenyl group, a coronenyl group, a trinaphthylenyl group, a heptaphenyl group, a heptacenyl group, a pyranthrenyl group, or an ovalenyl group.

In the dispersed solution of the carbon nanotubes, the $C_3$ to $C_{30}$ heterocyclic aromatic group of the head moiety of the dispersant may be a thiophenyl group, a thianthrenyl group, a phenothiarsinyl group, a furanyl group, a pyranyl group, an isobenzofuranyl group, a chromenyl group, a xanthenyl group, a phenoxatinyl group, an imidazolyl group, a pyrrolyl group, a pyrazolyl group, an isothiazolyl group, an isoxazolyl group, a pyridinyl group, a pyrazinyl group, a pyrimidinyl group, a pyradizinyl group, a pyrrolizinyl group, an indolizinyl group, an indolyl group, an indazolyl group, a purinyl group, a quinolizinyl group, an isoquinolinyl group, a phthalazinyl group, a naphthylidinyl group, a quinoxalinyl group, a quinazolinyl group, a cinnolinyl group, a pteridinyl group, a carbazolyl group, a phenantridinyl group, an acridinyl group, a perimidinyl group, a phenanthrolinyl group, a phenazinyl group, a phenomercazinyl group, a phenarazinyl group, a phenophosphazinyl group, a phenotellurazinyl group, a phenoselenazinyl group, a phenotiazinyl group, a phenoxazinyl group, an isochromanyl group, a chromanyl group, a pyrrolidinyl group, an imidazolidinyl group, a pyrazolidinyl group, a piperidinyl group, a piperazinyl group, an indolinyl group, an isoindolinyl group, a morpholinyl group, or a functional group represented by Formula 8 below:

<Formula 8>

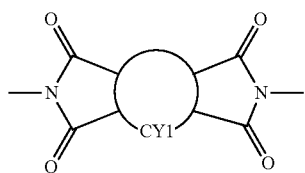

wherein CY1 of Formula 8 is an aromatic ring.

In the dispersed solution of the carbon nanotubes, the dispersant may be a compound selected from the group consisting of compounds represented by Formulae 9 through 23 below:
<Formula 9>
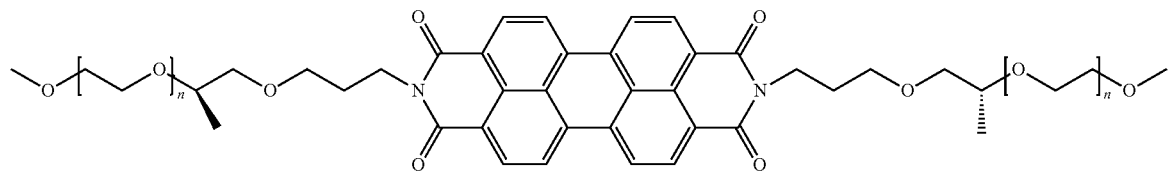
<Formula 10>
<Formula 11>
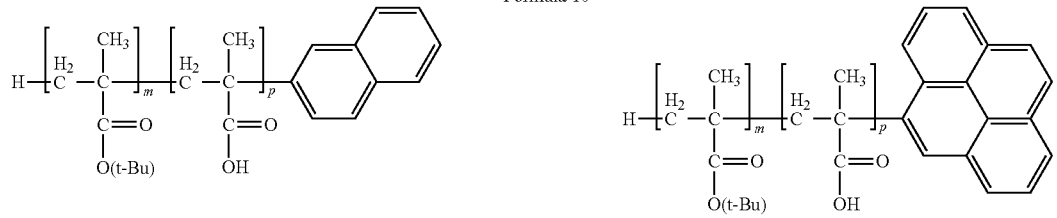
<Formula 12>
<Formula 13>
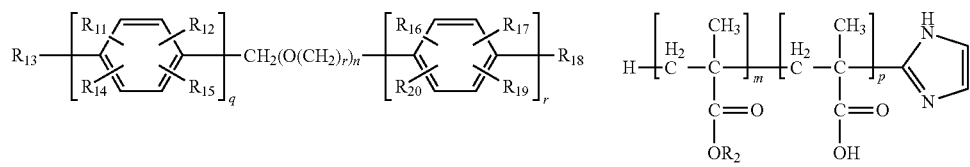
<Formula 14>
<Formula 15>
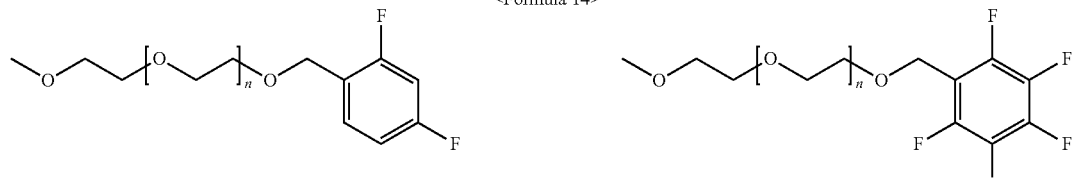
<Formula 16>
<Formula 17>
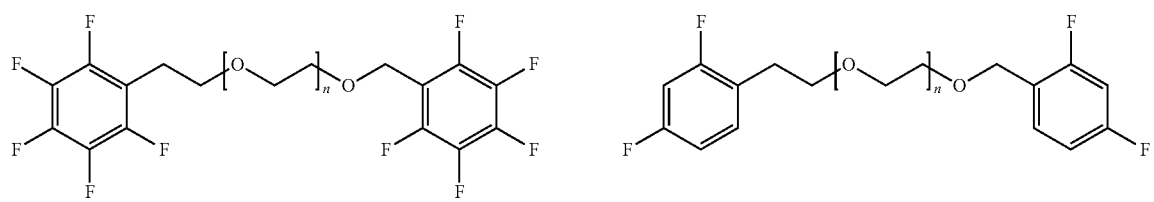
<Formula 18>
<Formula 19>
<Formula 20>
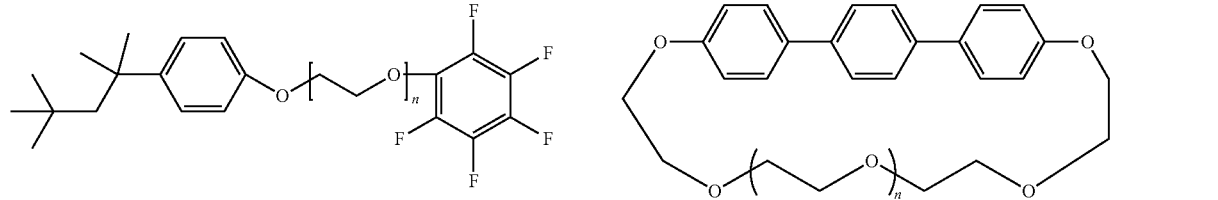

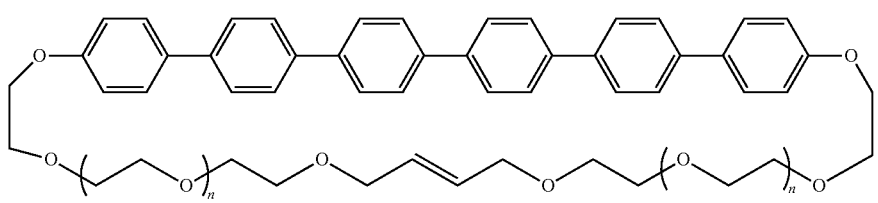

<Formula 21>

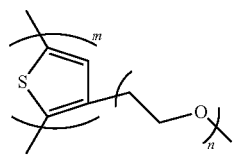

<Formula 22>

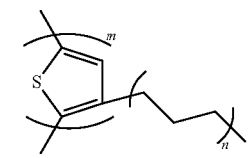

<Formula 23> wherein n is 1 to 12, and m, p, q, and r are each independently 1 to 60.

In the dispersed solution of the carbon nanotubes, the polycyclic aromatic hydrocarbon compound of the spacer, the heterocyclic aromatic compound of the spacer, the aromatic hydrocarbon group of the dispersant, and the heterocyclic aromatic group of the dispersant may be independently substituted by —F, —Cl, —Br, —CN, —NO$_2$, or —OH.

In the dispersed solution of the carbon nanotubes, the organic solvent may be hexanol, heptanol, octanol, nonanol, decanol, acetone, methylethylketone, ethylisobutylketone, methylisobutylketone, ethyleneglycol, ethyleneglycol methylether, ethyleneglycol mono-n-propylether, propyleneglycol, propyleneglycol methylether, propyleneglycol ethylether, propyleneglycol butylether, propyleneglycol propylether, dimethylformamide, dimethylacetoamide, N-methylpyrrolidone, N-ethylpyrrolidone, dimethylsulfoxide, γ-butyrolactone, methyl lactate, ethyl lactate, methyl β-methoxyisobutyrate, methyl α-hydroxyisobutyrate, aniline, N-methylaniline, hexane, terpineol, chloroform, toluene, propyleneglycol monomethylether acetate, chlorobenzene, dichlorobenzene, chloroform, N-methyl-2-pyrrolidone, or a combination comprising at least one of the foregoing.

The dispersed solution of the carbon nanotubes may include about 0.001 weight percent to about 5 weight percent of the carbon nanotubes, about 0.001 weight percent to about 5 weight percent of the spacer, about 0.001 weight percent to about 10 weight percent of the dispersant, with the balance of weight being the organic solvent.

According to another exemplary embodiment of the present invention, a method of preparing a dispersed solution of carbon nanotubes, includes inserting a spacer between carbon nanotubes; and dispersing the nanotubes using a dispersant.

In the method of preparing the dispersed solution of the carbon nanotubes, inserting the spacer between the carbon nanotubes and dispersing the nanotubes using the dispersant may be performed at the same time.

According to another exemplary embodiment of the present invention, a method of preparing a dispersed solution of carbon nanotubes includes adding carbon nanotubes to a solution containing a spacer to prepare a first carbon nanotube solution; sonicating the first carbon nanotube solution; adding a dispersant to the sonicated first carbon nanotube solution to prepare a second carbon nanotube solution; sonicating the second carbon nanotube solution; centrifuging the sonicated second carbon nanotube solution; and recovering a dispersed solution of the carbon nanotubes which are dispersed in the centrifuged second carbon nanotube solution.

According to another exemplary embodiment of the present invention, a method of preparing a dispersed solution of carbon nanotubes includes adding carbon nanotubes to a solution containing a spacer and a dispersant to prepare a carbon nanotube solution; sonicating the carbon nanotube solution; centrifuging the sonicated carbon nanotube solution; and recovering a dispersed solution of the carbon nanotubes which are dispersed in the centrifuged carbon nanotube solution.

BRIEF DESCRIPTION OF THE DRAWINGS

The above and other features and advantages of the present invention will become more clearly understood from the following detailed description taken in conjunction with the accompanying drawings, in which:

FIG. 1B is a graph illustrating the normalized absorbance spectra of the dispersed solutions of the carbon nanotubes prepared in Examples 1-4 and Comparative Example 1;

DETAILED DESCRIPTION OF THE INVENTION

Figure 1A:
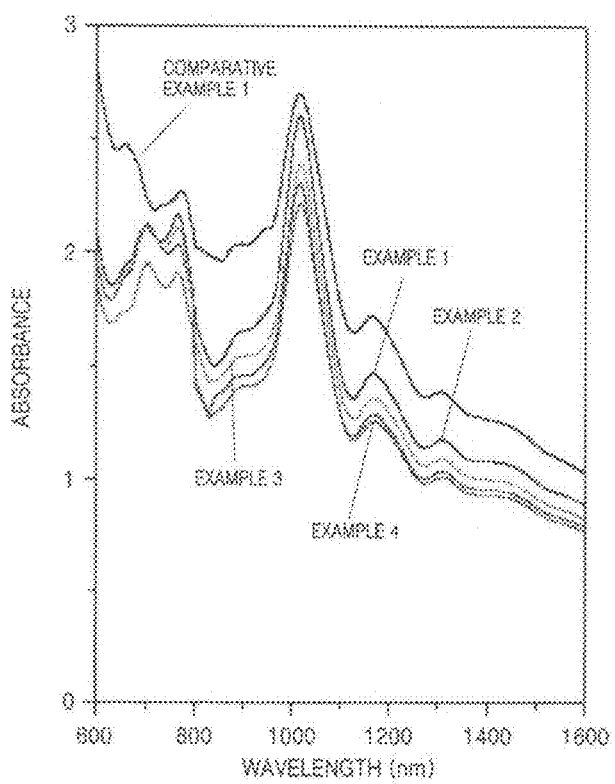
FIG. 1A is a graph illustrating the absorbance spectra of the dispersed solutions of carbon nanotubes prepared in Examples 1-4 and Comparative Example 1.
Figure 2A:
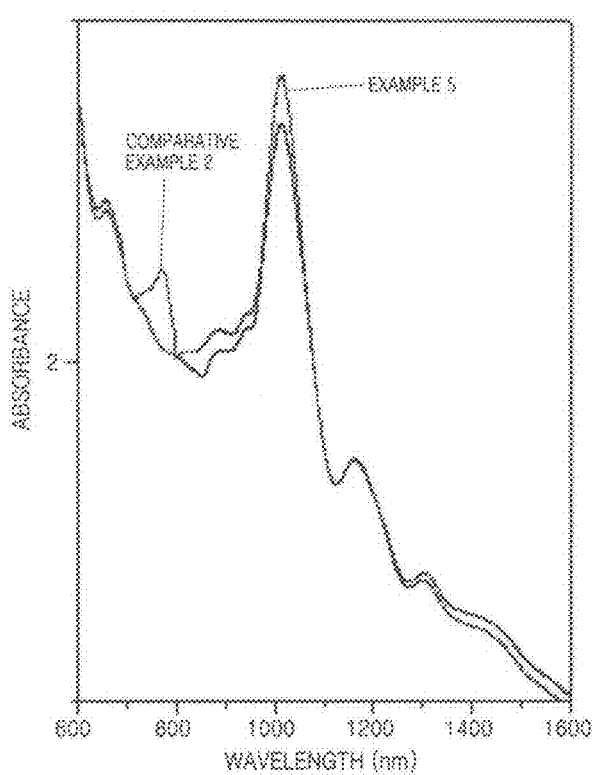
FIG. 2A is a graph illustrating the absorbance spectra of the dispersed solutions of carbon nanotubes prepared in Example 5 and Comparative Example 2.
Figure 2B:
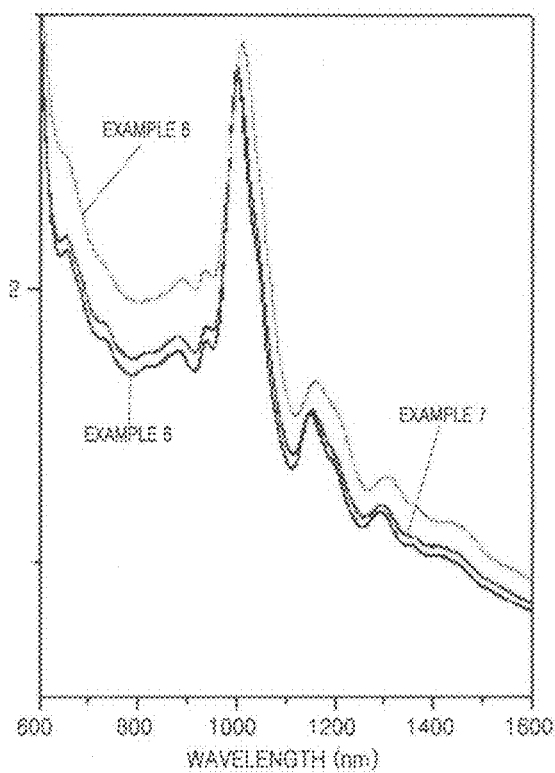
FIG. 2B is a graph illustrating the absorbance spectra of the dispersed solutions of carbon nanotubes prepared in Examples 6-8.

The present invention will now be described more fully hereinafter with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art. Like reference numerals refer to like elements throughout.

It will be understood that, although the terms first, second, third, and the like may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In an exemplary embodiment, a dispersed solution of carbon nanotubes (CNTs) according to the present invention includes a spacer preventing the bundling of carbon nanotubes, and thus, has improved dispersibility, unlike conventional dispersed solutions of carbon nanotubes having limited dispersibility without the use of a dispersion enhancer other than the dispersant. Thus, a dispersed solution of carbon nanotubes includes carbon nanotubes, an organic solvent, a spacer, and a dispersant.

In conventional dispersed solutions of carbon nanotubes (i.e., those without a dispersion enhancer other than a dispersant), debundling of carbon nanotube bundles may not be effectively achieved. The spacer as used herein is an aromatic compound that is easily adsorbed to surfaces of carbon nanotubes due to a smaller molecular size than the dispersant, a similar surface structure to the carbon nanotubes, and thus, high affinity to the carbon nanotubes, and no compatibility portion with the organic solvent.

Conventional dispersants serve to enhance the dispersibility of carbon nanotubes. However, in a case where carbon nanotubes are dispersed in the form of bundles, conventional dispersants cannot sufficiently separate individual carbon nanotubes from the carbon nanotube bundles. For example, a dispersant includes both a CNT affinity portion and a solvent compatibility portion in its molecule. Thus, the dispersant can be easily distributed at the interface between carbon nanotubes and a solvent, but has less affinity to surfaces of the carbon nanotubes. In this regard, in a case where an organic compound having low compatibility with a solvent and high affinity with carbon nanotubes is adsorbed to surfaces of carbon nanotubes, the carbon nanotubes have irregular surfaces, and thus, a distance between the carbon nanotubes is increased, thereby reducing an interaction between the carbon nanotubes. Furthermore, the use of a dispersant molecule having a similar structure to the spacer enables further enhancement of the dispersibility of the carbon nanotubes due to easy adsorption of the dispersant to the spacer.

The spacer may be a substituted or unsubstituted $C_7$ to $C_{30}$ polycyclic aromatic hydrocarbon compound or a substituted or unsubstituted $C_3$ to $C_{30}$ heterocyclic aromatic compound. The polycyclic aromatic hydrocarbon compound is a structure made up of, e.g., multiple benzene rings that are fused together. The polycyclic aromatic hydrocarbon compound has a similar surface structure to carbon nanotubes, and thus, can be easily adsorbed to the surfaces of the carbon nanotubes. Such structural characteristics are also applied to the heterocyclic aromatic compound.

The polycyclic aromatic hydrocarbon compound and the heterocyclic aromatic compound may include a wholly or partially fused ring system.

The choice of $C_7$ to $C_{30}$ polycyclic aromatic hydrocarbon compound is not limited, provided that it has a high affinity for carbon nanotubes. In more detail, the $C_7$ to $C_{30}$ polycyclic aromatic hydrocarbon compound may be, but is not limited to, pentalene, indene, naphthalene, azulene, heptalene, biphenylene, indacene, acenaphthylene, fluorene, phenalene, phenanthrene, anthracene, fluorathene, triphenylene, pyrene, chrycene, naphthacene, picene, perylene, pentaphene, hexacene, rubicene, coronene, trinaphthylene, heptaphene, heptacene, pyranthrene, ovalene, and the like.

The choice of $C_3$ to $C_{30}$ heterocyclic aromatic compound is not limited, provided that it has a high affinity for carbon nanotubes. The $C_3$ to $C_{30}$ heterocyclic aromatic compound may be, but is not limited to, thiophene, thianthrene, phenothiarsine, furan, pyran, isobenzofuran, chromene, xanthene, phenoxatin, imidazole, pyrrole, pyrazole, isothiazole, isoxazole, pyridine, pyrazine, pyrimidine, pyradizine, pyrrolizine, indolizine, indole, indazole, purine, quinolizine, isoquinoline, phthalazine, naphthylidine, quinoxaline, quinazoline, cinnoline, pteridine, carbazole, phenanthridine, acridine, perimidine, phenanthroline, phenazine, phenomercazine, phenarazine, phenophosphazine, phenotellurazine, phenoselenazine, phenotiazine, phenoxazine, isochroman, chroman, pyrrolidine, imidazolidine, pyrazolidine, piperidine, piperazine, indoline, isoindoline, morpholine, or a compound represented by Formula 1 below.

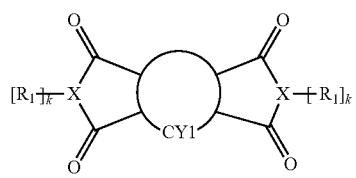

<Formula 1> wherein CY1 of Formula 1 is an aromatic ring; X is oxygen or nitrogen; k is 0 when X is oxygen and is 1 when X is nitrogen; and $R_1$ is hydrogen.

In Formula 1 above, CY1 may be any aromatic ring, such as a fused aromatic ring. In an exemplary embodiment, CY1 of Formula 1 is selected from the following compounds:

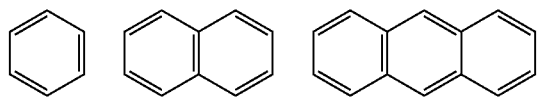

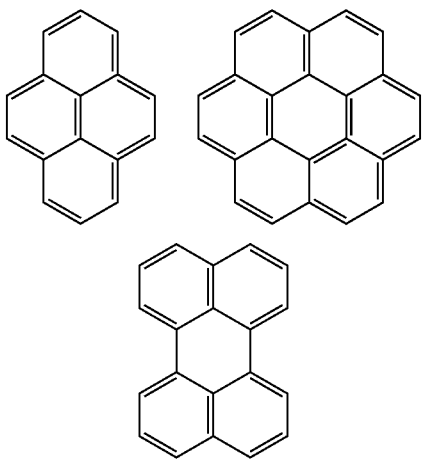

The aromatic ring has a similar structure to carbon nanotubes, and thus, allows the $C_3$ to $C_{30}$ heterocyclic aromatic compound spacer to have an affinity for carbon nanotubes.

In exemplary embodiments, the compound represented by Formula 1 may be a compound selected from the group consisting of compounds represented by Formulae 2 through 7 below:

<Formula 2>

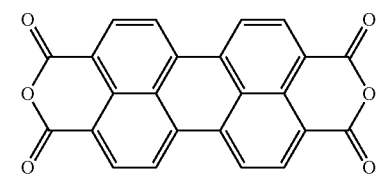

<Formula 3>

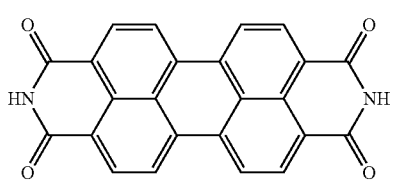

<Formula 4>

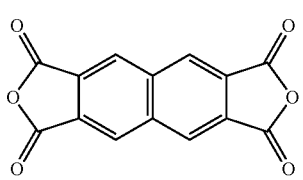

<Formula 5>

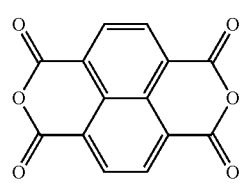

<Formula 6>

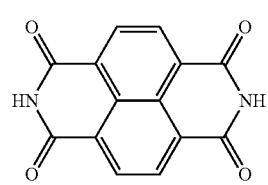

<Formula 7>

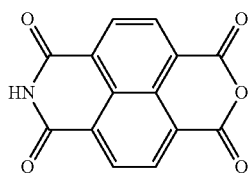

In the dispersed solution of the carbon nanotubes, the dispersant may be a compound that includes a head moiety comprising a substituted or unsubstituted $C_5$ to $C_{30}$ aromatic hydrocarbon group or a substituted or unsubstituted $C_3$ to $C_{30}$ heterocyclic aromatic group, and a tail moiety comprising a repeat unit of at least one selected from the group consisting of an acrylate group, an ethylene oxide group, a propylene oxide group, and an alkyl group, wherein the head moiety and the tail moiety may be connected to each other, and the molecular weight of the dispersant may be less than or equal to about 20,000. In an exemplary embodiment, the molecular weight of the dispersant is less than or equal to about 5,000.

The aromatic hydrocarbon group and the heterocyclic aromatic group may include a wholly or partially fused ring system. Specifically, in the dispersant, the $C_5$ to $C_{30}$ aromatic hydrocarbon group may be a phenyl group, a pentalenyl group, an indenyl group, a naphthyl group, an azulenyl group, a heptalenyl group, a biphenylenyl group, an indacenyl group, an acenaphthylenyl group, a fluorenyl group, a phenalenyl group, a phenanthrenyl group, an anthracenyl group, a fluorathenyl group, a picenyl group, a perylenyl group, a pentaphenyl group, a hexacenyl group, a rubicenyl group, a coronenyl group, a trinaphthylenyl group, a heptaphenyl group, a heptaceny) group, a pyranthrenyi group, an cvalenyl group, and the like.

The $C_3$ to $C_{30}$ heterocyclic aromatic group of the dispersant may be a thiophenyl group, a thianthrenyl group, a phenothiarsinyl group, a furanyl group, a pyranyl group, an isobenzofuranyl group, a chromenyl group, a xanthenyl group, a phenoxatinyl group, an imidazolyl group, a pyrrolyl group, a pyrazolyl group, an isothiazolyl group, an isoxazolyl group, a pyridinyl group, a pyrazinyl group, a pyrimidinyl group, a pyradizinyl group, a pyrrolizinyl group, an indolizinyl group, an indotyl group, an indazolyl group, a punnyl group, a quinolizinyl group, an isoquinolinyl group, a phthalazinyl group, a naphthylidinyl group, a quinoxalinyl group, a quinazolinyl group, a cinnolinyl group, a pteridinyl group, a carbazolyl group, a phenanthridinyl group, an acridinyl group, a perimidinyl group, a phenanthrolinyl group, a phenazinyl group, a phenomercazinyl group, a phenarazinyl group, a phenophosphazinyl group, a phenotellurazinyl group, a phenoselenazinyl group, a phenotiazinyl group, a phenoxazinyl group, an isochromanyl group, a chromanyl group, a pyrrolidinyl group, an imidazolidinyl group, a pyrazolidinyl group, a piperidinyl group, a piperazinyl group, an indolinyl group, an isoindolinyl group, a morpholinyl group, or a functional group represented by Formula 8 below:

<Formula 8>

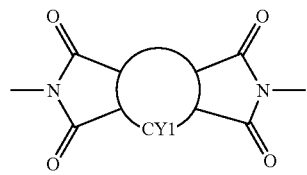

wherein CY1 of Formula 8 is an aromatic ring.

In exemplary embodiments, the dispersant may be a compound selected from the group consisting of compounds represented by Formulae 9 through 23 below:
<Formula 9>
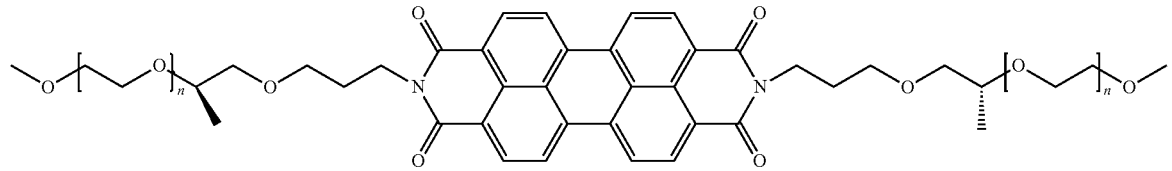
<Formula 10>
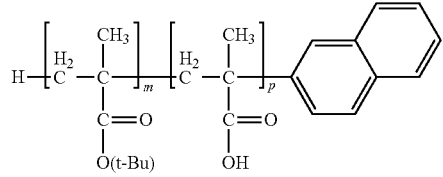
<Formula 11>
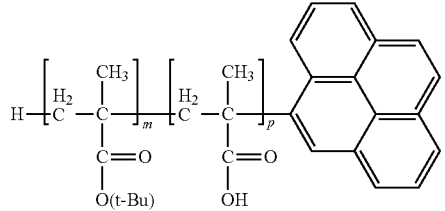
<Formula 12>
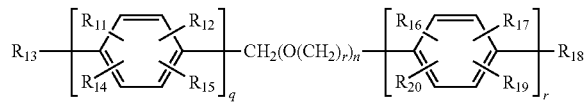
<Formula 13>
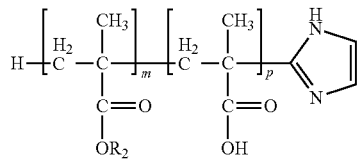
<Formula 14>
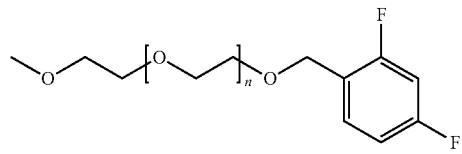
<Formula 15>
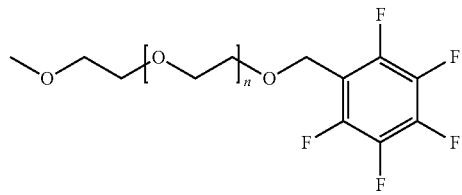
<Formula 16>
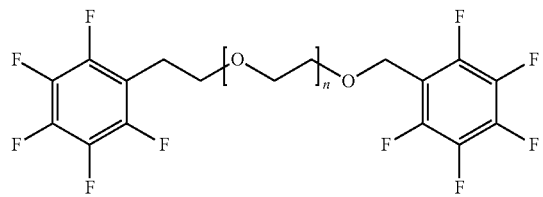
<Formula 17>
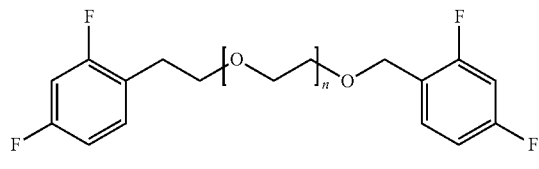
<Formula 18>
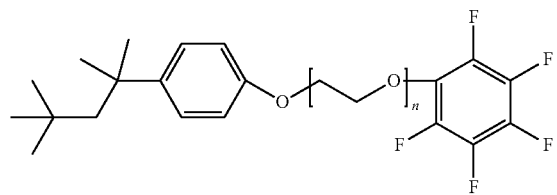
<Formula 19>
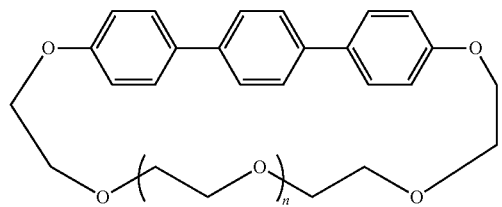
<Formula 20>
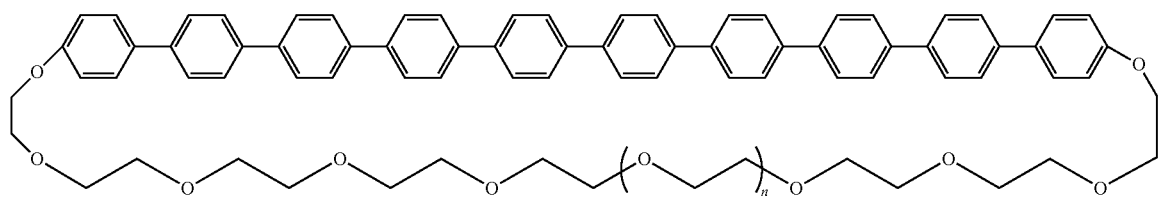

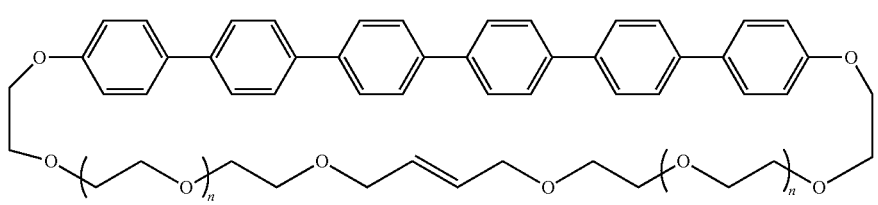

<Formula 21>

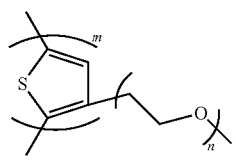

<Formula 22>

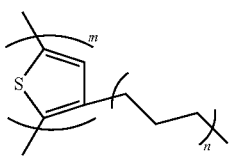

<Formula 23> wherein n is 1 to 12, and m, p, q, and r are each independently 1 to 60.

The polycyclic aromatic hydrocarbon compound of the spacer, the heterocyclic aromatic compound of the spacer, the aromatic hydrocarbon group of the dispersant, and the heterocyclic aromatic group of the dispersant may independently be substituted by —F, —Cl, —Br, —CN, —$NO_2$, or —OH.

The choice of organic solvent is not particularly limited. Exemplary organic solvents include hexanol, heptanol, octanol, nonanol, decanol, acetone, methylethylketone, ethylisobutylketone, methylisobutylketone, ethyleneglycol, ethyleneglycol methylether, ethyleneglycol mono-n-propylether, propyleneglycol, propyleneglycol methylether, propyleneglycol ethylether, propyleneglycol butylether, propyleneglycol propylether, dimethylformamide, dimethylacetoamide, N-methylpyrrolidone, N-ethylpyrrolidone, dimethylsulfoxide, γ-butyrolactone, methyl lactate, ethyl lactate, methyl β-methoxyisobutyrate, methyl α-hydroxyisobutyrate, aniline, N-methylaniline, hexane, terpineol, chloroform, toluene, propyleneglycol monomethylether acetate (PGMEA), chlorobenzene, dichlorobenzene, chloroform, N-methyl-2-pyrrolidone (NMP), and the like, and a combination comprising at least one of the foregoing.

In an exemplary embodiment, the dispersed solution of the carbon nanotubes includes about 0.001 to about 5 weight percent (wt %) carbon nanotubes, about 0.001 to about 5 wt % spacer, about 0.001 to about 10 wt % dispersant, with the balance of the weight being the organic solvent.

If the content of the carbon nanotubes is less than about 0.001 wt %, the characteristics of the carbon nanotubes may not be sufficiently exhibited. On the other hand, if it exceeds about 5 wt %, solvation may be limited due to a high specific surface area and a low density. If the content of the spacer is less than about 0.001 wt %, the number of the spacer molecules contacting with the carbon nanotubes may be small relative to a surface area of the carbon nanotubes. On the other hand, if it exceeds about 5 wt %, the solubility and characteristics of the spacer may be reduced.

A method of preparing a dispersed solution of carbon nanotubes, generally includes inserting a spacer between carbon nanotubes; and dispersing the carbon nanotubes using a dispersant. Inserting the spacer between the carbon nanotubes and dispersing the nanotubes using the dispersant may be performed at the same time.

When the spacer and the dispersant are added sequentially, the method of preparing the dispersed solution of the carbon nanotubes may be performed as follows. The carbon nanotubes are added to a solution including the spacer to prepare a first carbon nanotube solution including the carbon nanotubes and the spacer. The first carbon nanotube solution is sonicated to disperse the carbon nanotubes. At this time, the spacer is adsorbed to surfaces of the carbon nanotubes. Then, the dispersant is added to the sonicated first carbon nanotube solution to prepare a second carbon nanotube solution including the carbon nanotubes, the spacer, and the dispersant. The second carbon nanotube solution is sonicated to disperse the carbon nanotubes. At this time, the dispersant is adsorbed to the surfaces of the carbon nanotubes which are spaced a predetermined distance apart from each other by the spacer. The sonicated second carbon nanotube solution is centrifuged, and a dispersed solution of the carbon nanotubes which are dispersed in the centrifuged second carbon nanotube solution is recovered.

When the spacer and the dispersant are added at the same time, the method of preparing the dispersed solution of the carbon nanotubes may be performed as follows. The carbon nanotubes are added to a solution including the spacer and the dispersant to prepare a carbon nanotube solution including the spacer, the dispersant, and the carbon nanotubes. The carbon nanotube solution is sonicated to disperse the carbon nanotubes. Then, the sonicated carbon nanotube solution is centrifuged, and a dispersed solution of the carbon nanotubes which are dispersed in the centrifuged carbon nanotube solution is recovered.

In the method of preparing the dispersed solution of the carbon nanotubes, the spacer may be selected from all the spacers disclosed herein. Similarly, the dispersant may be selected from all the dispersants disclosed herein.

Hereinafter, the present invention will be described more specifically with reference to the following examples. However, these examples are given for illustrative purposes, and are not intended to limit the scope of the invention.

Preparation of Dispersed Solutions of Carbon Nanotubes

Example 1

About 1 milligram (mg) of perylene-3,4,9,10-tetracarboxylic dianhydride used as a spacer was dissolved in about 10 milliliters (ml) of N-methyl-2-pyrrolidone (NMP), and 2 mg of single-walled carbon nanotubes were added thereto. The resultant solution was sonicated in a sonic bath (35 kHz, 400 W) for about 4 hours so that the carbon nanotubes were sufficiently dispersed. Then, a solution of about 2 mg of a dispersant represented by Formula 24 below in about 10 ml of NMP was added to the resultant dispersed solution. The resultant solution was sonicated in a sonic bath (35 kHz, 400 W) for about 8.5 hours so that the carbon nanotubes were dispersed, and then centrifuged at about 8,000 revolutions per minute (rpm) for about 10 minutes to obtain a dispersed solution of the carbon nanotubes.

Example 2

A dispersed solution of carbon nanotubes was prepared in the same manner as in Example 1 except that about 1 mg of the dispersant of Formula 24 above was used.

Example 3

A dispersed solution of carbon nanotubes was prepared in the same manner as in Example 1 except that about 0.5 mg of perylene-3,4,9,10-tetracarboxylic dianhydride were used as a spacer and about 1 mg of the dispersant of Formula 24 above was used.

Example 4

About 1 mg of perylene-3,4,9,10-tetracarboxylic dianhydride used as a spacer and about 1 mg of the dispersant of Formula 24 above were dissolved in about 20 ml of NMP, and about 2 mg of single-walled carbon nanotubes were added thereto. The resultant solution was sonicated in a sonic bath (35 kHz, 400 W) for about 12.5 hours so that the carbon nanotubes were dispersed, and then centrifuged at about 8,000 rpm for about 10 minutes to obtain a dispersed solution of the carbon nanotubes.

Example 5

About 1 mg of anthraquinone used as a spacer was dissolved in about 10 ml of NMP, and about 2 mg of single-walled carbon nanotubes were added thereto. The resultant solution was sonicated in a sonic bath (35 kHz, 400 W) for about 4 hours so that the carbon nanotubes were dispersed. Then, a solution of about 2 mg of the dispersant of Formula 24 above in about 10 ml of NMP was added to the resultant dispersed solution. The resultant solution was sonicated in a sonic bath (35 kHz, 400 W) for about 4 hours so that the carbon nanotubes were dispersed, and then centrifuged at about 8,000 rpm for about 10 minutes to obtain a dispersed solution of the carbon nanotubes.

Example 6

A dispersed solution of carbon nanotubes was prepared in the same manner as in Example 5 except that about 1 mg of anthraquinone was used as a spacer and about 1 mg of poly (2-methoxy-5-(2-ethylhexyloxy)-1,4-pheylene vinylene) was used as a dispersant.

Example 7

A dispersed solution of carbon nanotubes was prepared in the same manner as in Example 6 except that about 0.5 mg of anthraquinone were used as a spacer.

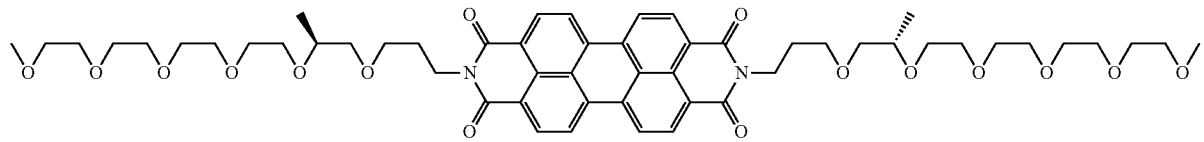

<Formula 24>

Example 8

A dispersed solution of carbon nanotubes was prepared in the same manner as in Example 5 except that about 1 mg of anthraquinone was used as a spacer and about 1 mg of poly (3-hexyl thiophene) ($M_W$: 2,500) was used as a dispersant.

Comparative Example 1

A dispersed solution of carbon nanotubes was prepared in the same manner as in Example 4 except that no spacer was used and about 2 mg of the dispersant of Formula 24 above were used.

Comparative Example 2

A dispersed solution of carbon nanotubes was prepared in the same manner as in Example 5 except that no spacer was used and about 2 mg of the dispersant of Formula 24 above were used.

Evaluation of Dispersion Characteristics of Dispersed Solutions of Carbon Nanotubes Absorbance spectra of the dispersed solutions of the carbon nanotubes prepared in Examples 1-8 and Comparative Examples 1-2 were measured using a UV-Vis-NIR spectrophotometer (Cary 5000, Absorbance mode, Scanning speed: 300 nanometers per minute) between about 200 nanometers (nm) and 1800 nm, and the results are presented in Table 1 below as well as in FIGS. 1A, 1B, 1C, and 1D. Normalized widths of $E_{11}^S$ peaks at about 1,000 nm were calculated from Equation 1 below by normalizing the absorption spectra. FIG. 1B illustrates the normalized absorption spectra of the dispersed solutions of the carbon nanotubes prepared in Examples 1-4 and Comparative Example 1.

TABLE 1

| Example | Normalized width |
|---|---|
| Example 1 | 105.5 |
| Example 2 | 108.7 |
| Example 3 | 105.7 |
| Example 4 | 98.7 |
| Example 5 | 128.3 |
| Example 6 | 76.2 |
| Example 7 | 94.5 |
| Example 8 | 119.4 |
| Comparative Example 1 | 169.8 |
| Comparative Example 2 | 207.5 |

Figure 3:
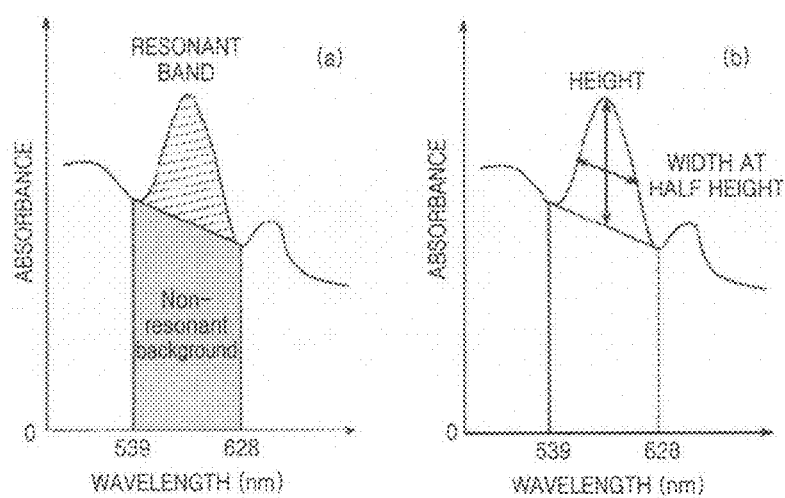
FIG. 3 is a graph illustrating theoretical absorbance data defining a normalized width.

The normalized width in Table 1 above is defined by Equation 1 below, and the width and height of a resonant band are defined in FIG. 3.

Normalized width=(width of resonant band)/(height of resonant band) <Equation 1>

The normalized width of Equation 1 is the criteria for evaluating the degree of dispersion of a dispersed solution. As the normalized width decreases, the degree of dispersion increases.

As shown in Table 1 above, the dispersed solutions of the carbon nanotubes prepared in Examples 1-8 exhibited a normalized width less than about 130, whereas the dispersed solutions of the carbon nanotubes prepared in Comparative Examples 1-2 exhibited a normalized width of about 169 or more. That is, the degree of dispersion of the dispersed solutions of the carbon nanotubes prepared in Examples 1-8 wherein both a dispersant and a spacer were used was improved relative to that of the dispersed solutions of the carbon nanotubes prepared in Comparative Examples 1-2 in which no spacer was used. Such improved dispersibility of the dispersed solutions of the carbon nanotubes prepared in Examples 1-8 is attributed to the use of a spacer that is adsorbed to surfaces of carbon nanotubes and thus reduces the van der Waals forces of the carbon nanotubes, thereby preventing the bundling of the carbon nanotubes, resulting in an increase in the degree of dispersion of the carbon nanotubes.

A dispersed solution of carbon nanotubes according to the present invention includes both a spacer for reducing the van der Waals force of carbon nanotubes and preventing the bundling of the carbon nanotubes and a dispersant for maintaining the debundling and stability of the carbon nanotubes, thereby improving the dispersibility of the carbon nanotubes. A method of preparing the dispersed solution of the carbon nanotubes according to the present invention can easily produce a dispersed solution of carbon nanotubes without separately performing a chemical treatment.

Although the present invention has been described herein with reference to the foregoing exemplary embodiments, these exemplary embodiments do not serve to limit the scope of the present invention. Accordingly, those skilled in the art to which the present invention pertains will appreciate that various modifications are possible, without departing from the spirit and scope of the present invention as defined by the following claims.

What is claimed is:

1. A dispersed solution of carbon nanotubes, comprising:
   carbon nanotubes;
   an organic solvent;
   a spacer; and
   a dispersant,
   wherein the dispersant is a compound comprising:
   a head moiety comprising a substituted or unsubstituted $C_5$ to $C_{30}$ aromatic hydrocarbon group or a substituted or unsubstituted $C_3$ to $C_{30}$ heterocyclic aromatic group; and
   a tail moiety comprising a repeat unit selected from the group consisting of an acrylate group, an ethylene oxide group, a propylene oxide group, and an alkyl group, wherein the head moiety and the tail moiety are connected to each other, and the molecular weight of the dispersant is less than or equal to about 20,000, wherein the dispersant is a compound represented by Formulae 9 through 11:

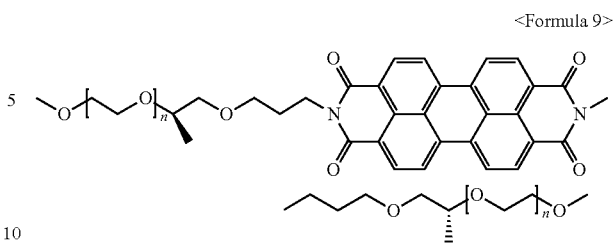

<Formula 9>

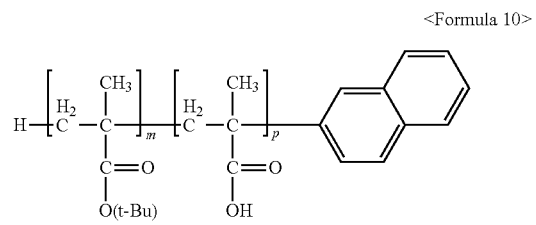

<Formula 10>

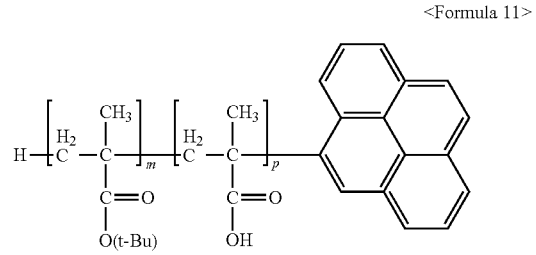

<Formula 11> wherein n is 1 to 12, and m and p are each independently 1 to 60.

2. The dispersed solution of claim 1, wherein the spacer is a compound selected from the group consisting of a substituted or unsubstituted $C_7$ to $C_{30}$ polycyclic aromatic hydrocarbon compound or a substituted or unsubstituted $C_3$ to $C_{30}$ heterocyclic aromatic compound.

3. The dispersed solution of claim 2, wherein the $C_7$ to $C_{30}$ polycyclic aromatic hydrocarbon compound is a compound selected from the group consisting of pentalene, indene, naphthalene, azulene, heptalene, biphenylene, indacene, acenaphthylene, fluorene, phenalene, phenanthrene, anthracene, fluorathene, triphenylene, pyrene, chrycene, naphthacene, picene, perylene, pentaphene, hexacene, rubicene, coronene, trinaphthylene, heptaphene, heptacene, pyranthrene, and ovalene.

4. The dispersed solution of claim 2, wherein the $C_3$ to $C_{30}$ heterocyclic aromatic compound is a compound selected from the group consisting of thiophene, thianthrene, phenothiarsine, furan, pyran, isobenzofuran, chromene, xanthene, phenoxatin, imidazole, pyrrole, pyrazole, isothiazole, isoxazole, pyridine, pyrazine, pyrimidine, pyradizine, pyrolizine, indolizine, indole, indazole, purine, quinolizine, isoquinoline, phthalazine, naphthylidine, quinoxaline, quinazoline, cinnoline, pteridine, carbazole, phenantridine, acridine, perimidine, phenanthroline, phenazine, phenomercazine, phenarazine, phenophosphazine, phenotellurazine, phenoselenazine, phenotiazine, phenoxazine, iso chroman, chroman, pyrrolidine, imidazolidine, pyrazolidine, piperidine, piperazine, indoline, isoindoline, morpholine, and a compound represented by Formula 1 below:

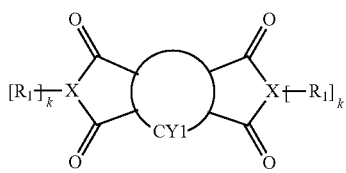

<Formula 1> wherein CY 1 of Formula 1 is an aromatic ring;

X is oxygen or nitrogen;

k is 0 when X is oxygen and is 1 when X is nitrogen; and $R_1$ is hydrogen.

5. The dispersed solution of claim 4, wherein CY1 of Formula 1 is selected from the group consisting of

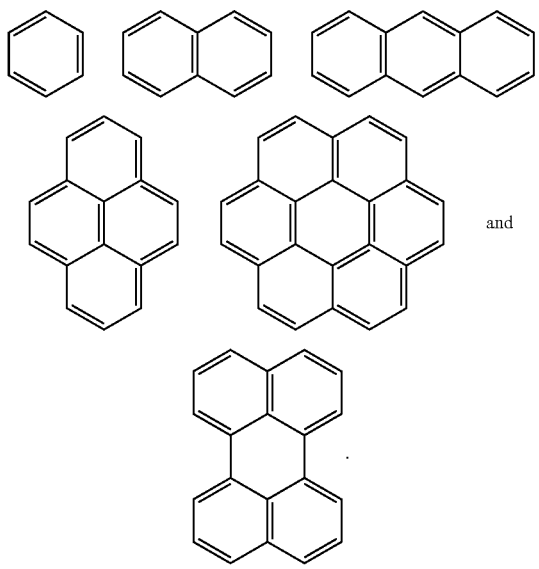

and

6. The dispersed solution of claim 4, wherein the compound of Formula 1 is a compound selected from the group consisting of compounds represented by Formulae 2 through 7:

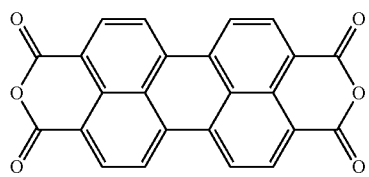

<Formula 2>

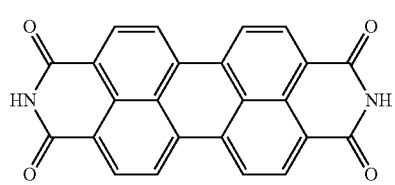

<Formula 3>

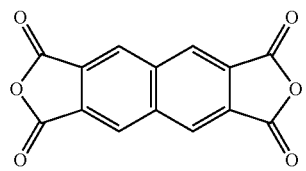

<Formula 4>

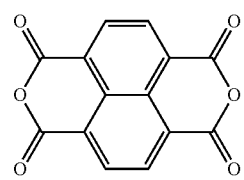

<Formula 5>

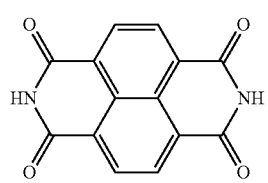

<Formula 6>

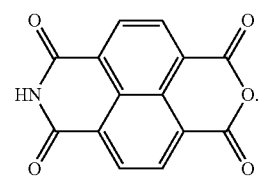

<Formula 7>

7. The dispersed solution of claim 2, wherein the polycyclic aromatic hydrocarbon compound, the heterocyclic aromatic compound, or both are independently substituted by —F, —Cl, —Br, —CN, —$NO_2$, or —OH.

8. The dispersed solution of claim 1, wherein the organic solvent is selected from the group consisting of hexanol, heptanol, octanol, nonanol, decanol, acetone, methylethylketone, ethylisobutylketone, methylisobutylketone, ethyleneglycol, ethyleneglycol methylether, ethyleneglycol mono-n-propylether, propyleneglycol, propyleneglycol methylether, propyleneglycol ethylether, propyleneglycol butylether, propyleneglycol propylether, dimethylformamide, dimethylacetoamide, N-methylpyrrolidone, N-ethylpyrrolidone, dimethylsulfoxide, γ-butyrolactone, methyl lactate, ethyl lactate, methyl β-methoxyisobutyrate, methyl α-hydroxyisobutyrate, aniline, N-methylaniline, hexane, terpineol, chloroform, toluene, propyleneglycol monomethylether acetate, chlorobenzene, dichlorobenzene, chloroform, and N-methyl-2-pyrrolidone, or a combination comprising at least one of the foregoing.

9. The dispersed solution of claim 1, wherein the dispersed solution comprises about 0.001 weight percent to about 5 weight percent carbon nanotubes, about 0.001 weight percent to about 5 weight percent spacer, about 0.001 weight percent to about 10 weight percent dispersant, and a balance of a weight of the dispersed solution being the organic solvent.

10. A method of preparing a dispersed solution of carbon nanotubes, the method comprising:

inserting a spacer between carbon nanotubes; and dispersing the carbon nanotubes using a dispersant and an organic solvent, wherein the dispersant is a compound comprising:
a head moiety comprising a substituted or unsubstituted C₅ to C₃₀ aromatic hydrocarbon group or a substituted or unsubstituted C₃ to C₃₀ heterocyclic aromatic group; and
a tail moiety comprising a repeat unit selected from the group consisting of an acrylate group, an ethylene oxide group, a propylene oxide group, and an alkyl group, wherein the head moiety and the tail moiety are connected to each other, and the molecular weight of the dispersant is less than or equal to about 20,000, wherein the dispersant is a compound represented by Formulae 9 through 11:

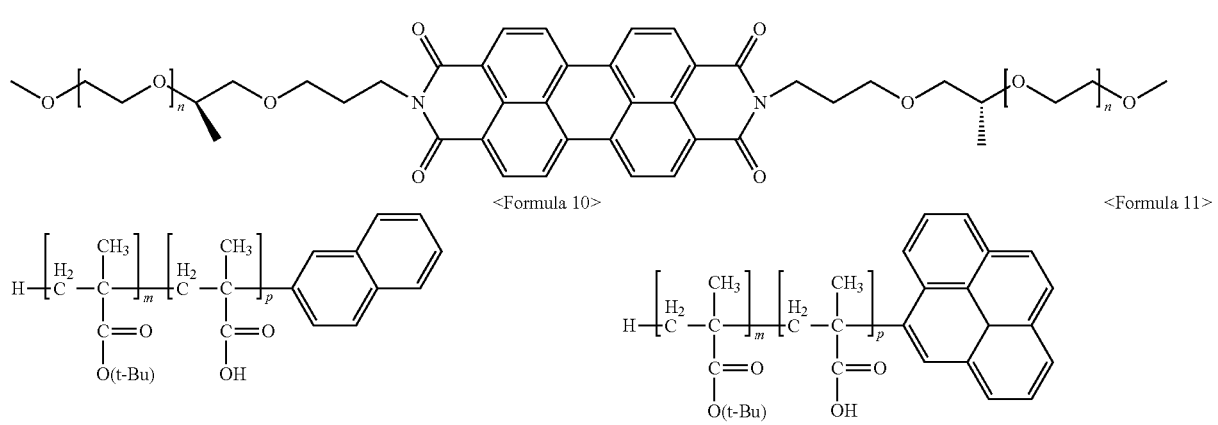

<Formula 1> wherein CY1 of Formula 1 is an aromatic ring;
X is oxygen or nitrogen;
k is 0 when X is oxygen and is 1 when X is nitrogen; and
$R_1$ is hydrogen.

wherein n is 1 to 12, and m and p are each independently 1 to 60.

11. The method of claim 10, wherein the inserting the spacer between the carbon nanotubes and dispersing the nanotubes using the dispersant are performed at the same time.

12. The method of claim 10, wherein the spacer is a compound selected from the group consisting of a substituted or unsubstituted $C_7$ to $C_{30}$ polycyclic aromatic hydrocarbon compound or a substituted or unsubstituted $C_3$ to $C_{30}$ heterocyclic aromatic compound.

13. The method of claim 12, wherein the $C_7$ to $C_{30}$ polycyclic aromatic hydrocarbon compound is a compound selected from the group consisting of pentalene, indene, naphthalene, azulene, heptalene, biphenylene, indacene, acenaphthylene, fluorene, phenalene, phenanthrene, anthracene, fluorathene, triphenylene, pyrene, chrycene, naphthacene, picene, perylene, pentaphene, hexacene, rubicene, coronene, trinaphthylene, heptaphene, heptacene, pyranthrene, and ovalene.

14. The method of claim 12, wherein the $C_3$ to $C_{30}$ heterocyclic aromatic compound is a compound selected from the group consisting of thiophene, thianthrene, phenothiarsine, furan, pyran, isobenzofuran, chromene, xanthene, phenoxatin, imidazole, pyrrole, pyrazole, isothiazole, isoxazole, pyridine, pyrazine, pyrimidine, pyradizine, pyrrolizine, indolizine, indole, indazole, purine, quinolizine, isoquinoline, phthalazine, naphthylidine, quinoxaline, quinazoline, cinnoline, pteridine, carbazole, phenantridine, acridine, perimidine, phenanthroline, phenazine, phenomercazine, phenarazine, phenophosphazine, phenotellurazine, phenoselenazine, phenotiazine, phenoxazine, iso chroman, chroman, pyrrolidine, imidazolidine, pyrazolidine, piperidine, piperazine, indoline, isoindoline, morpholine, and a compound represented by Formula 1 below:

15. The method of claim 14, wherein CY1 of Formula 1 is selected from the group consisting of

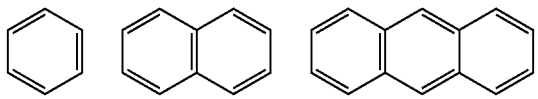

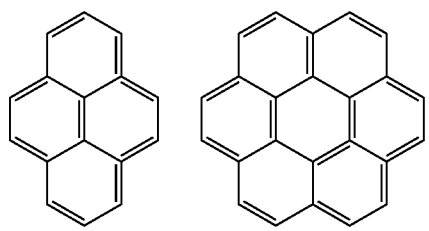
and

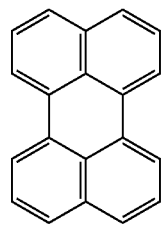

16. The method of claim 14, wherein the compound of Formula 1 is a compound selected from the group consisting of compounds represented by Formulae 2 through 7:

<Formula 2>

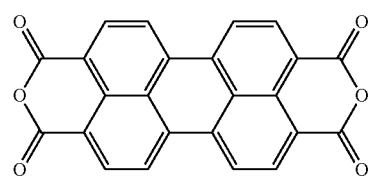

<Formula 3>

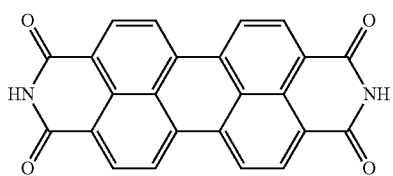

<Formula 4>

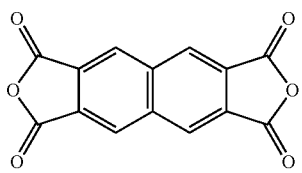

<Formula 5>

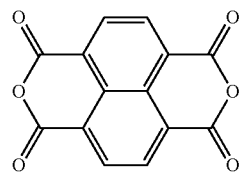

-continued

<Formula 6>

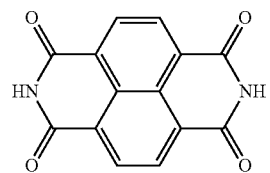

<Formula 7>

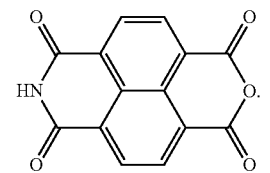

17. A method of preparing a dispersed solution of carbon nanotubes, the method comprising:

adding carbon nanotubes to a solution containing a spacer to prepare a first carbon nanotube solution;

sonicating the first carbon nanotube solution;

adding a dispersant and an organic solvent to the sonicated first carbon nanotube solution to prepare a second carbon nanotube solution;

sonicating the second carbon nanotube solution;

centrifuging the sonicated second carbon nanotube solution; and recovering a dispersed solution of the carbon nanotubes which are dispersed in the centrifuged second carbon nanotube solution, wherein the dispersant is a compound comprising:

a head moiety comprising a substituted or unsubstituted $C_5$ to $C_{30}$ aromatic hydrocarbon group or a substituted or unsubstituted $C_3$ to $C_{30}$ heterocyclic aromatic group; and a tail moiety comprising a repeat unit selected from the group consisting of an acrylate group, an ethylene oxide group, a propylene oxide group, and an alkyl group, wherein the head moiety and the tail moiety are connected to each other, and the molecular weight of the dispersant is less than or equal to about 20,000, wherein the dispersant is a compound represented by Formulae 9 through 11:

<Formula 9>

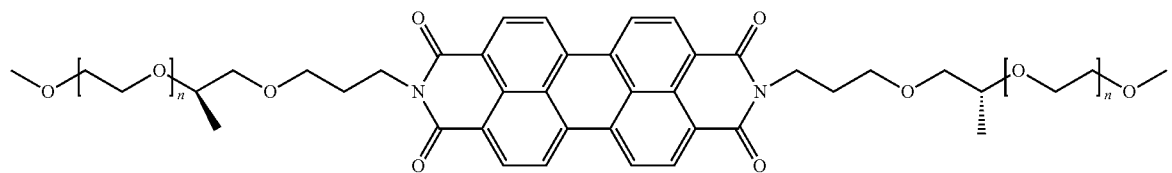

<Formula 10> <Formula 11>

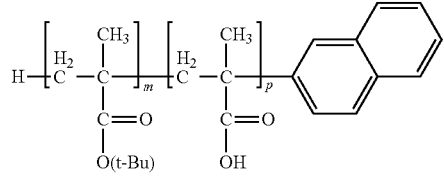

wherein n is 1 to 12, and m and p are each independently 1 to 60.

18. A method of preparing a dispersed solution of carbon nanotubes, the method comprising:

adding carbon nanotubes to a solution containing a spacer, an organic solvent and a dispersant to prepare a carbon nanotube solution;

sonicating the carbon nanotube solution;

centrifuging the sonicated carbon nanotube solution; and recovering a dispersed solution of the carbon nanotubes which are dispersed in the centrifuged carbon nanotube solution, wherein the dispersant is a compound comprising:

a head moiety comprising a substituted or unsubstituted $C_5$ to $C_{30}$ aromatic hydrocarbon group or a substituted or unsubstituted $C_3$ to $C_{30}$ heterocyclic aromatic group; and a tail moiety comprising a repeat unit selected from the group consisting of an acrylate group, an ethylene oxide group, a propylene oxide group, and an alkyl group, wherein the head moiety and the tail moiety are connected to each other, and the molecular weight of the dispersant is less than or equal to about 20,000, wherein the dispersant is a compound represented by Formulae 9 through 11:

<Formula 9>

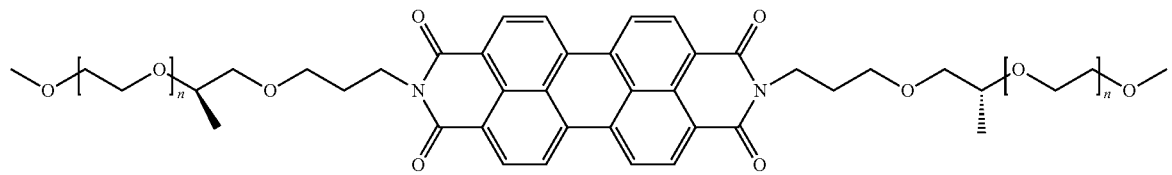

<Formula 11>

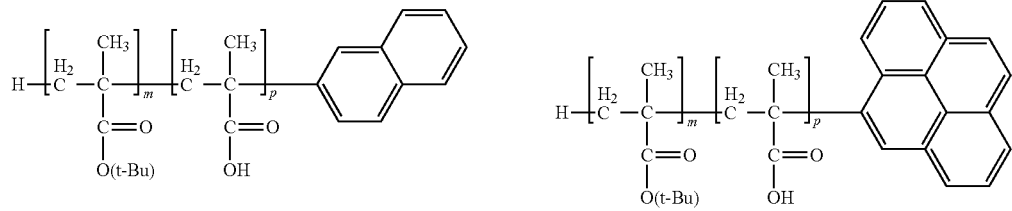

wherein n is 1 to 12, and m and p are each independently 1 to 60.

* * * * *